United States Patent Office 3,029,122
Patented Apr. 10, 1962

3,029,122
ICE COLOR COUPLING COMPONENT COMPOSITION
Frederick W. Posselt and Lester N. Stanley, Delmar, N.Y., assignors to General Aniline & Film Corporation, New York, N.Y., a corporation of Delaware
No Drawing. Filed Dec. 31, 1956, Ser. No. 631,473
7 Claims. (Cl. 8—46)

The instant invention relates to improvements in ice color coupling component compositions, and more particularly to stable ice color coupling compositions in which the ice color coupling component is Naphthol AS–SW.

In the azoic (or ice color) dyeing and printing of fibrous materials such as textile fibers, leather and the like, a diazotizable aromatic or heterocyclic primary amine, usually called the azoic diazo base, devoid of water-solubilizing groups such as carboxylic and sulfonic acid groups, is diazotized and coupled on the fiber with an azoic coupling component, also devoid of solubilizing groups.

In one method of azoic dyeing and/or printing, the azoic coupler in alkaline medium is applied to the fiber and the pigment developed in situ by treatment with a freshly prepared diazo or with a diazo which has been stabilized through salt formation, this latter group of compounds being the so-called Fast Color Salts. The ice color coupling components are as a rule not soluble in neutral solution but only in alkali. Naphthol AS–SW, which is 3-hydroxy-2-naphthoic acid β-naphthalide, is well known as such an ice color or azoic coupling component. With the recent commercial advent of azoic coupling components in solution form, particularly with the assistance of inorganic alkalis such as caustic soda or potash, the provision of Naphthol AS–SW in such solution form to the trade presents certain difficulties. Naphthol AS–SW, in an aqueous alkaline solution, tends to decompose on storage into the free acid and free β-naphthylamine. β-naphthylamine is highly toxic and the use of such aqueous alkaline solutions accordingly presents an undesirable hazard. Further, because of the insoluble nature of the Naphthol AS–SW the aqueous solutions thereof which can be provided are not as highly concentrated as could be desired. The maximum solubility which is usually attainable is 31%.

It is an object of this invention to provide a stable azoic coupler composition containing Naphthol AS–SW. It is another object of this invention to provide a more highly concentrated azoic coupler composition containing Naphthol AS–SW. A further object of this invention is to provide a concentrate of Naphthol AS–SW which will not be subject to the above disadvantages. Other objects and advantages will appear as the description proceeds.

The attainment of the above objects is made possible by the instant invention which includes the provision of a substantially anhydrous azoic coupler composition comprising, in about molecularly equivalent proportions, 3-hydroxy-2-naphthoic acid β-naphthalide and a non-diazotizable organic basic amine, and about 0.25 to 2.5 parts of a nitrogen-containing organic solvent selected from the group consisting of 2-pyrrolidone, formamide and their N-lower alkyl and N-lower hydroxyalkyl substituted derivatives per part of weight of the 3-hydroxy-2-naphthoic acid-β-naphthalide. It has been found that the above-defined coupler compositions of this invention are surprisingly much more stable to decomposition and enable the provision of more highly concentrated solutions (of up to 38%) of the Naphthol AS–SW than solutions of the Naphthol AS–SW in aqueous alkali prepared in accordance with known procedures. The compositions of this invention may be dispersed in an aqueous bath in known manner for application to the fibrous material to be dyed by the azoic method.

The organic basic amine employed in the compositions of this invention must be one which is incapable of being diazotized and thereby interfering with the attainment of the desired dyeing results. The exact nature of the function of the organic basic amine is not definitely known, but it is believed that it forms with the Naphthol AS–SW a salt which is soluble or readily dispersible in the above-defined nitrogen-containing organic solvents and in the aqueous dyebath in which the fibrous material to be dyed is treated. Such organic basic amines are preferably liquid under normal atmospheric conditions and water-soluble in the concentrations in which they are employed in the aqueous dyebath. However, more volatile amines may be employed, being introduced into the instant compositions by bubbling and maintaining therein by salt formation and/or solution or the like.

The non-diazotizable organic basic amines employed in the instant compositions may in general be selected from the group consisting of lower alkyl amines, lower hydroxyalkyl amines, and mono-nuclear heterocyclic amines. As examples of such amines, the following may be mentioned for illustrative purposes: Ethylene diamine, propylene diamine, butylene diamine, diethylene triamine, triethylene tetramine, the mono-, di-, and tri-methyl amines, -ethylamines, and -propylamines, the mono-, di- and triethanolamines and propanolamines, 2-diethylaminoethanol, morpholine, piperidine, pyridine, quinoline, and the like.

The amount of organic basic amine employed should be at least molecularly equivalent to the Naphthol AS–SW, but preferably no more than 10% in excess thereof. It will be understood that correspondingly smaller proportions of the organic basic amine may be employed when there is contained therein more than one amino group.

The 2-pyrrolidones which may be employed as nitrogen-containing organic solvents in the compositions of the instant invention have the formula

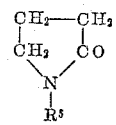

wherein $R^5$ is H or an alkyl or hydroxyalkyl radical of from 1 to 3 carbon atoms such as ethyl, propyl, isopropyl, hydroxethyl, and especially methyl. It will be understood that one or more hydrogen atoms in the cyclic methylene groups of the above formula may be substituted by a lower alkyl group such as methyl or ethyl or the like. Such pyrrolidones and their methods of production are well known in the art and no claim is made thereto per se.

As formamide and substituted formamide solvents which may be employed in the compositions of the instant invention, there may be mentioned formamide, N-methyl formamide, N-ethyl formamide, N,N-dimethyl formamide, N,N-diethyl formamide, N-hydroxyethyl formamide, N,N-dihydroxyethyl formamide, and the like.

The above defined nitrogen-containing organic solvents or mixtures thereof are employed in the compositions of the instant invention in proportions ranging from about 0.25 to 2.5 parts per part of Naphthol AS–SW, by weight. The lower proportions within this range may be insufficient to yield a clear solution although the resulting pastes or slurries possess the desired improved and unexpected properties with respect to stability, concentration and the like. It is generally preferred, however, to employ an amount ranging from about 1 to 2.5 parts of said nitrogen-containing organic solvent per part of Naphthol AS–SW since clear solutions or concentrates may be thereby attained. Such solutions are more stable in storage with respect to formation of precipitated material and toxic $\beta$-naphthylamine, particularly under varying atmospheric conditions, and are capable of solubilizing larger amounts of Naphthol AS–SW (more highly concentrated) than aqueous alkaline solutions of Naphthol AS–SW prepared in accordance with previously employed procedures. The latter property relative to concentration is of course highly advantageous with respect to ease and economy in shipping, handling and use.

It will be understood that the compositions and concentrates of the instant invention may contain small amounts of protective agents or colloids, dispersing agents, and other assistants known in the art. A sufficient amount of dispersing agent or other surface active agent, preferably of the nonionic type well known in the art, may also be included to facilitate ready dispersion or solubilization of the instant compositions or concentrates in the aqueous baths employed for treating the fibrous material to be dyed. The components of the instant compositions may be combined in any desired manner or order, although it is preferred to combine the organic nitrogen-containing solvent with the organic basic amine and then add the Naphthol AS–SW.

Since the instant compositions are fairly concentrated, they are diluted prior to use, to a range of about .5 g.–7 g. and preferably about 2–3 g. Naphthol AS–SW per 100 cc. water. Cotton, leather or other fibrous material is padded with this solution, usually at room temperature for about 30–120 minutes, rinsed and dried, followed by treatment with the diazo compound, either as a freshly prepared diazo or as a solution of a Fast Color Salt.

The following examples, in which parts are by weight unless otherwise indicated, are illustrative only of the instant invention and are not to be regarded as limitative.

EXAMPLE 1

200 g. N-methyl-2-pyrrolidone, 31.2 g. monoethanolamine, 140 g. Naphthol AS–SW and 2.2 g. Casein B–1 (blended lactic casein, Borden Co.) mixed well. A clear solution designated "A" was produced.

A control solution, designated "B," was made up according to the usual formulation for a Naphthol AS–SW solution as follows:

199 g. ethylene glycol, 44 g. ethylene glycol ethyl ether, 2 g. Casein B–1, 1 g. Sequestrene AA (ethylenediaminetetraacetic acid) and 37 g. potassium hydroxide were stirred to solution. 140 g. Naphthol AS–SW were added and stirred to solution. This was made up to 443 g. by addition of 20 g. of water.

Samples of A and B were stored at 40° C. over a period of several months, and tested periodically for the presence of $\beta$-naphthylamine by standard analytical procedures. The results appear in the following Table I:

Table I
WEIGHT PERCENT $\beta$-NAPHTHYLAMINE

| At Start | After | | |
|---|---|---|---|
| | 28 days | 108 days | 133 days |
| A. .0147 | .019 | .08 | .097 |
| B. .0098 | .03 | .2448 | .365 |

It is apparent that in a period of a little over 4 months, the percent of $\beta$-naphthylamine in A had increased by 6.6 times and in B, by 41 times. The initial percentage difference is within the limits of experimental error. These improved results are even more surprising in view of the 37½% concentration of solution A as compared with the 31½% concentration of solution B.

EXAMPLE 2

200 g. N-methyl-2-pyrrolidone, 45 g. morpholine and 140 g. Naphthol AS–SW were mixed well. A clear solution was produced which, after several months standing, had a very low $\beta$-naphthylamine content.

EXAMPLE 3

60 g. 2-diethylaminoethanol, 200 g. N-methyl-2-pyrrolidone and 140 g. Naphthol AS–SW were mixed well. A clear solution was produced which, after several months standing had a very low $\beta$-naphthylamine content.

The solutions in the following Table II were made up and tested. All of them had good stability on standing:

Table II

| Ex. | Naphthol AS-SW, g. | Ethanolamine, g. | Piperidine, g. | Dimethylamine, g. | Diethylamine, g. | Diethanolamine, g. | N-methyl-2-pyrrolidone, g. | Formamide, g. | N,N-dimethyl formamide, g. |
|---|---|---|---|---|---|---|---|---|---|
| 4 | 140 | | 45 | | | | 200 | | |
| 5 | 140 | | | 35 | | | 200 | | |
| 6 | 140 | | | | | 40 | 200 | | |
| 7 | 140 | 31.2 | | | | | 210 | | |
| 8 | 140 | 31.2 | | | | | 190 | | |
| 9 | 140 | 31.2 | | | | | | 215 | |
| 10 | 140 | 31.2 | | | | | | | 210 |
| 11 | 140 | | | | | 40 | 200 | | |

EXAMPLE 12

42 g. Naphthol AS–SW solution, prepared as per Example 1 above, 28 cc. ethyl alcohol, 5.6 cc. caustic soda 34° Bé. and 14 cc. cold water are pasted together. This is added to a solution of 25.4 cc. caustic soda 34° Bé. in 1 liter water.

100 g. cotton is impregnated in a bath containing 150 cc. of the above solution made up to 1 liter and containing 7 cc. caustic soda 34° Bé. at room temperature for 20 minutes, rinsed and squeezed.

9 g. 2-methoxy-5-nitrobenzenediazonium chloride zinc chloride double salt is dissolved in 1 liter water and the cotton impregnated in this bath for 20 minutes at room temperature. After rinsing, soaping and drying, the cotton is dyed a good red shade.

This invention has been disclosed with respect to certain preferred embodiments, and there will become obvious to persons skilled in the art various modifications, equivalents or variations thereof which are intended to be included within the spirit and scope of this invention.

We claim:
1. A clear substantially anhydrous azoic coupler composition comprising, in about molecularly equivalent proportions, 3-hydroxy-2-naphthoic acid $\beta$-naphthalide and a water-soluble non-diazotizable organic basic amine selected from the group consisting of lower alkyl amines, lower hydroxyalkyl amines, and mono-nuclear heterocyclic amines, and about 0.25 to 2.5 parts of a nitrogen-containing organic solvent selected from the group con- sisting of 2-pyrrolidone, formamide and their N-lower alkyl and N-lower hydroxyalkyl substituted derivatives per part by weight of the 3-hydroxy-2-naphthoic acid β-naphthalide, said lower alkyl and lower hydroxyalkyl groups containing 1 to 4 carbon atoms.

2. A clear substantially anhydrous azoic coupler solution comprising, in about molecularly equivalent proportions, 3-hydroxy-2-naphthoic acid β-naphthalide and a water-soluble non-diazotizable organic basic amine selected from the group consisting of lower alkyl amines, lower hydroxyalkyl amines, and mono-nuclear heterocyclic amines, and about 1 to 2.5 parts of a nitrogen-containing organic solvent selected from the group consisting of 2-pyrrolidone, formamide and their N-lower alkyl and N-lower hydroxyalkyl substituted derivatives per part by weight of the 3-hydroxy-2-naphthoic acid β-naphthalide, said lower alkyl and lower hydroxyalkyl groups containing 1 to 4 carbon atoms.

3. A clear substantailly anhydrous azoic coupler solution comprising, in about molecularly equivalent proportions, 3-hydroxy-2-naphthoic acid β-naphthalide and mono-ethanolamine, and about 1 to 2.5 parts of N-methyl-2-pyrrolidone per part by weight of the 3-hydroxy-2-naphthoic acid β-naphthalide.

4. A clear substantially anhydrous azoic coupler solution comprising, in about molecularly equivalent proportions, 3-hydroxy-2-naphthoic acid β-naphthalide and morpholine, and about 1 to 2.5 parts of N-methyl-2-pyrrolidone per part by weight of the 3-hydroxy-2-naphthoic acid β-naphthalide.

5. A clear substantailly anhydrous azoic coupler solution comprising, in about molecularly equivalent proportions, 3-hydroxy-2-naphthoic acid β-naphthalide and 2-diethylaminoethanol, and about 1 to 2.5 parts of N-methyl-2-pyrrolidone per part by weight of the 3-hydroxy-2-naphthoic acid β-naphthalide.

6. A clear substantially anhydrous azoic coupler solution comprising, in about molecularly equivalent proportions, 3-hydroxy-2-naphthoic acid β-naphthalide and dimethylamine, and about 1 to 2.5 parts of N-methyl-2-pyrrolidone per part by weight of the 3 - hydroxy - 2-naphthoic acid β-naphthalide.

7. A clear substantially anhydrous azoic coupler solution comprising, in about molecularly equivalent proportions, 3-hydroxy-2-naphthoic acid β-naphthalide and diethanolamine, and about 1 to 2.5 parts of N-methyl-2-pyrrolidone per part by weight of the 3 - hydroxy - 2-naphthoic acid β-naphthalide.

References Cited in the file of this patent

FOREIGN PATENTS 668,961    Great Britain _____ Mar. 26, 1952

OTHER REFERENCES

Diserens, L.: "The Chemical Technology of Dyeing and Printing," Reinhold Publishing Co. (1948), pages 237–8, 241.